US010784750B2

(12) United States Patent
Gerstler et al.

(10) Patent No.: US 10,784,750 B2
(45) Date of Patent: Sep. 22, 2020

(54) ELECTRIC MOTOR HAVING AN INTEGRATED COOLING SYSTEM AND METHODS OF COOLING AN ELECTRIC MOTOR

(71) Applicant: General Electric Company, Schenectady, NY (US)

(72) Inventors: William Dwight Gerstler, Niskayuna, NY (US); Florian Stefan Hoefler, Ismaning (DE); Mark Aaron Chan Chan, Munich (DE)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 16/006,094

(22) Filed: Jun. 12, 2018

(65) Prior Publication Data
US 2019/0379257 A1    Dec. 12, 2019

(51) Int. Cl.
*H02K 9/20*        (2006.01)
*H02K 5/20*        (2006.01)
(Continued)

(52) U.S. Cl.
CPC .............. *H02K 9/20* (2013.01); *F01D 1/04* (2013.01); *F01D 9/02* (2013.01); *F01D 25/12* (2013.01);
(Continued)

(58) Field of Classification Search
CPC .. H02K 9/20; H02K 5/20; H02K 7/14; H02K 9/19; H02K 9/14; F04D 29/5806;
(Continued)

(56) References Cited

U.S. PATENT DOCUMENTS 4,850,812 A    7/1989  Voight
5,072,145 A *  12/1991 Davis .................... H02K 5/20
                                                        310/54
(Continued)

FOREIGN PATENT DOCUMENTS

DE    102011076025 A1    11/2012
WO       WO9113256 A1     9/1991

OTHER PUBLICATIONS

Yung, Cool facts about cooling electric motors, Industry Applications Society 60th Annual Petroleum and Chemical Industry Conference, Sep. 23-25, 2013, Chicago, pp. 1-10.
(Continued)

*Primary Examiner* — John K Kim
(74) *Attorney, Agent, or Firm* — Dority & Manning, P.A.

(57) ABSTRACT

The present disclosure pertains to electric machines such as electric propulsion systems for aircraft that integrated cooling systems, and methods of cooling such an electric machine. Exemplary electric machines include an electric motor that has a stator, a rotor, and a drive shaft operably coupled to the rotor. Exemplary electric machines further include a motor cooling conduit that defines a pathway for conveying a cooling fluid through or around at least a portion of the electric motor, a casing assembly that circumferentially surrounds at least a portion of the electric motor, a casing assembly conduit integrally formed within at least a portion of the casing assembly which defines a pathway for conveying the cooling fluid through the at least a portion of the casing assembly, and a pump or compressor operably coupled to the drive shaft and configured to circulate the cooling fluid through the motor cooling conduit and the casing assembly conduit.

19 Claims, 9 Drawing Sheets

(51) Int. Cl.
*F04D 29/58* (2006.01)
*F01D 25/26* (2006.01)
*F01D 25/12* (2006.01)
*F01D 9/02* (2006.01)
*F01D 1/04* (2006.01)
*B64D 27/24* (2006.01)
*B64D 27/02* (2006.01)

(52) U.S. Cl.
CPC ......... *F01D 25/26* (2013.01); *F04D 29/5806* (2013.01); *H02K 5/20* (2013.01); *B64D 27/24* (2013.01); *B64D 2027/026* (2013.01); *F05D 2220/323* (2013.01); *F05D 2260/20* (2013.01)

(58) Field of Classification Search
CPC . F01D 25/26; F01D 25/12; F01D 9/02; F01D 1/04; F05D 2260/20; F05D 2220/323; B64D 2027/026; B64D 27/24; F02K 5/00
USPC ..................... 310/52, 61, 60 A, 64
See application file for complete search history.

(56) References Cited

U.S. PATENT DOCUMENTS

| | | | |
|---|---|---|---|
| 5,293,089 A | 3/1994 | Frister | |
| 5,332,369 A | 7/1994 | Jensen | |
| 5,770,903 A * | 6/1998 | Bland | H02K 9/19 310/64 |
| 6,685,447 B2 * | 2/2004 | Mabe | F04B 35/04 29/428 |
| 7,021,905 B2 | 4/2006 | Torrey et al. | |
| 7,462,963 B2 * | 12/2008 | Ishihara | H02K 9/20 310/58 |
| 7,759,828 B2 | 7/2010 | Zhong | |
| 8,456,047 B2 | 6/2013 | Pal et al. | |
| 8,616,834 B2 | 12/2013 | Knight, III et al. | |
| 9,762,106 B2 | 9/2017 | Gauthier et al. | |
| 2003/0143093 A1 * | 7/2003 | Mabe | F04D 25/06 417/423.8 |
| 2006/0113851 A1 * | 6/2006 | Ishihara | H02K 9/20 310/52 |
| 2007/0274848 A1 | 11/2007 | Arbogast et al. | |
| 2012/0049668 A1 * | 3/2012 | Garriga | F16C 35/042 310/59 |
| 2012/0104884 A1 | 5/2012 | Wagner et al. | |
| 2012/0161554 A1 | 6/2012 | Ghelardi et al. | |
| 2013/0002064 A1 | 1/2013 | De Bock et al. | |
| 2016/0149451 A1 | 5/2016 | Teter et al. | |
| 2017/0184024 A1 | 6/2017 | Sennoun | |
| 2018/0051716 A1 * | 2/2018 | Cheung | B64C 21/06 |
| 2019/0379257 A1 * | 12/2019 | Gerstler | F01D 1/04 |

OTHER PUBLICATIONS

NATEGH_Thermal Modeling of Directly Cooled Electric Machines Using Lumped Parameter and Limited CFD Analysis, IEEE Transactions on Energy Conversion, Oct. 24, 2013, vol. 28, Issue 4, pp. 970-990.

International Search Report Corresponding to Application No. PCT/US2019/036730 dated Sep. 5, 2019.

* cited by examiner

ELECTRIC MOTOR HAVING AN INTEGRATED COOLING SYSTEM AND METHODS OF COOLING AN ELECTRIC MOTOR

FIELD

The present disclosure relates to electric machines with integrated cooling systems and methods of cooling an electric machine, and electric propulsion systems for aircraft that utilize such systems and methods.

BACKGROUND

Electric motors and similarly electric propulsion systems for aircraft typically require a cooling system to cool the electric motor or propulsion system. Such as cooling system typically includes a heat exchanger and a pump coupled together with various pipes, hoses, fittings, and the like to circulate fluid between the motor and the heat exchanger. These components add weight, which reduces the power density of the motor or propulsion system. Additionally, these components and their associated pipes, hoses, fittings, and the like increase the steps required to install or uninstall an electric motor or propulsion system on an aircraft. Accordingly, there exists a need for electric motors and electric propulsion systems for aircraft with improved cooling systems and improved methods of cooling an electric motor.

BRIEF DESCRIPTION

Aspects and advantages will be set forth in part in the following description, or may be obvious from the description, or may be learned through practicing the presently disclosed subject matter.

In one aspect, the present disclosure embraces electric machines that have an integrated cooling system. An exemplary electric machine includes an electric motor that has a stator, a rotor, and a drive shaft operably coupled to the rotor. An exemplary electric machine further includes a motor cooling conduit, a casing assembly that includes a casing assembly conduit integrally formed within at least a portion of the casing assembly, and a pump or compressor operably coupled to the drive shaft and configured to circulate the cooling fluid through the motor cooling conduit and the casing assembly conduit. The motor cooling conduit defines a pathway for conveying a cooling fluid through or around at least a portion of the electric motor, and the motor cooling conduit has a thermally conductive relationship with the at least a portion of the electric motor. The casing assembly circumferentially surrounds at least a portion of the electric motor. The casing assembly conduit defines a pathway for conveying the cooling fluid through the at least a portion of the casing assembly, and the casing assembly conduit has a thermally conductive relationship with an external surface of the casing assembly.

In another aspect, the present disclosure embraces an electric propulsion system for an aircraft. An exemplary electric propulsion system includes an electric motor that has a stator, a rotor, and a drive shaft operably coupled to the rotor. Exemplary electric propulsion systems include a motor cooling conduit that defines a pathway for conveying a cooling fluid through or around at least a portion of the electric motor, and the motor cooling conduit has a thermally conductive relationship with the at least a portion of the electric motor. An exemplary electric propulsion system further includes a fan or propeller operably coupled to the drive shaft. Further, the exemplary electric propulsion system includes a casing assembly that circumferentially surrounds at least a portion of the electric motor. The casing assembly includes a motor casing, a nacelle, a plurality of support members circumferentially supporting the nacelle about the motor casing, and a casing assembly conduit integrally formed within at least a portion of the casing assembly. The casing assembly conduit defines a pathway for conveying the cooling fluid through the at least a portion of the casing assembly, and the casing assembly conduit has a thermally conductive relationship with an external surface of the casing assembly. The exemplary electric propulsion system further includes a pump or compressor operably coupled to the drive shaft, with the pump or compressor being operably configured to circulate cooling fluid through the motor cooling conduit and the casing assembly conduit.

In yet another aspect, the present disclosure embraces methods of cooling an electric machine, such as an electric machine used for propulsion of an aircraft. An exemplary method includes circulating a cooling fluid through a motor cooling conduit that defines a pathway for conveying a cooling fluid through or around at least a portion of an electric motor that has a stator and a rotor. The motor cooling conduit has a thermally conductive relationship with the at least a portion of an electric motor, and the exemplary method includes transferring heat from the electric motor to the cooling fluid circulating through the motor cooling conduit by the thermally conductive relationship with the at least a portion of the electric motor. The exemplary method further includes circulating the cooling fluid through a casing assembly conduit integrally formed within at least a portion of a casing assembly. The casing assembly conduit defines a pathway for conveying the cooling fluid through the at least a portion of the casing assembly, and the casing assembly circumferentially surrounds at least a portion of the electric motor. The casing assembly conduit has a thermally conductive relationship with an external surface of the casing assembly, and the exemplary method includes transferring heat from the cooling fluid circulating through the casing assembly conduit to airflow passing over the external surface of the casing assembly by the thermally conductive relationship with the external surface of the casing assembly. The cooling fluid is circulated through the motor cooling conduit and the casing assembly conduit at least in part by a pump or a compressor operably coupled to a drive shaft, with the drive shaft also operably coupled to the rotor of the electric motor.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
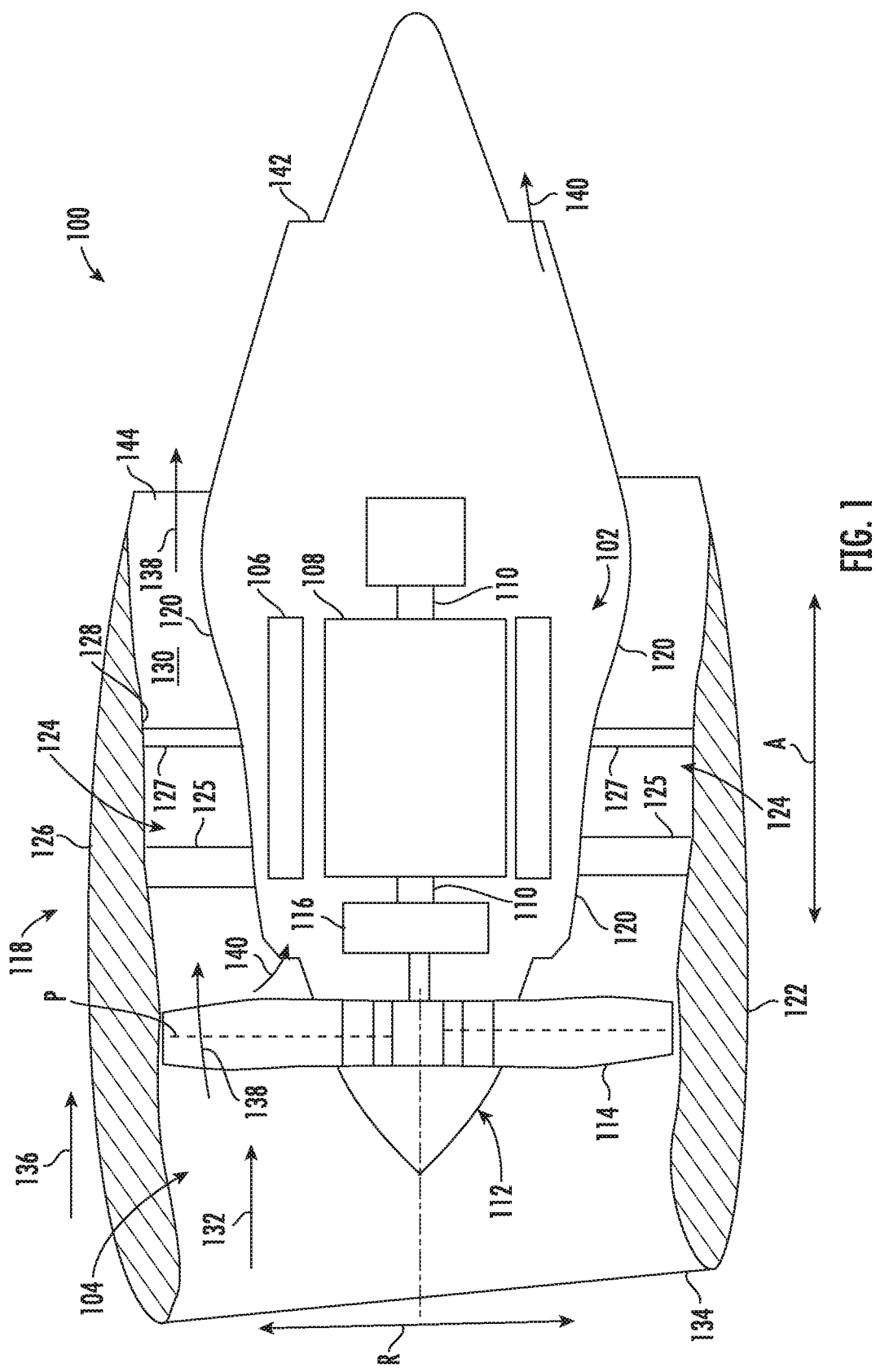
FIG. 1 schematically shows an exemplary electric propulsion system for an aircraft.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally pertains to electric motors and electric propulsion systems that have integrated cooling systems, and methods of cooling an electric motor or propulsion system. As an example the presently disclosed electric motors and electric propulsion systems may be employed in an aircraft, such as for propulsion of the aircraft, including in commercial, military, or civilian aircraft, as well as unmanned aircraft such as unmanned aerial vehicles, electric rotorcraft, drones, and the like.

The presently disclosed electric motors and electric propulsion systems include a stator, a rotor, a drive shaft operably coupled to the rotor, and a pump or compressor operably coupled to the drive shaft, and configured to circulate cooling fluid through a motor cooling conduit and a casing assembly conduit. The motor cooling conduit defines a pathway for conveying a cooling fluid through or around at least a portion of the electric motor or electric propulsion system. The casing assembly conduit defines a pathway for conveying the cooling fluid through at least a portion of a casing assembly that circumferentially surrounds at least a portion of the electric motor or propulsion system. An electric propulsion system for an aircraft may include a presently disclosed electric motor with a fan or propeller operably coupled to the drive shaft.

The integrated cooling system provides electric motors and propulsion systems that have a higher power density, are more efficient, and easier to install and uninstall. In some embodiments, the integrated cooling system may address certain thermal management needs of the electric motor or propulsion system, which in some embodiments may reduce or eliminate certain needs for auxiliary components, such as external pumps, external heat exchangers as well as associated pipes, hoses, and fittings, and the like. This may allow for electric motors that can be installed, for example, in an electric propulsion system of an aircraft, without requiring certain service connections apart from power connections for the electric motor and associated electronics for diagnostics and controls. In some embodiments the presently disclosed electric motors and propulsion systems with integrated cooling systems may allow for more compact, lighter-weight components, which further improves power density and operating efficiency.

Various embodiments of the present disclosure will now be described in greater detail. Referring to FIG. 1, an exemplary electric machine and/or electric propulsion system 100 for an aircraft is shown. In the example embodiment, the electric propulsion system 100 is a hybrid-electric turbine engine. In general, the electric propulsion system 100 includes an electric motor 102 and a fan section 104 driven by the electric motor 102. In some embodiments, a core turbine engine (not shown) may be disposed downstream from the fan section 104. The electric motor 102 includes a stator 106 and a rotor 108. The rotor 108 is operably coupled to a driveshaft 110.

For the embodiment depicted, the fan section 104 includes a fan 112 (e.g., a variable pitch fan) having a plurality of fan blades 114 operably coupled to the drive shaft 110 in a spaced apart manner and rotatable about longitudinal axis A by the drive shaft 110. Alternatively, or in addition, the electric propulsions system may include a propeller or other rotatable airfoil assembly. The fan or propeller 112 may be operably coupled to the drive shaft 110 directly or across a gear box 116 that includes a plurality of gears for adjusting the rotational speed of the fan or propeller 112 relative to the drive shaft 110 to a more efficient rotational speed.

A casing assembly 118 includes an annual casing that circumferentially surrounds at least a portion of the electric propulsion system 100. The casing assembly 118 shown in FIG. 1 includes a motor casing 120 (e.g. a cowling, a housing, etc.), a fan casing or nacelle 122, and a plurality of circumferentially spaced support members (e.g., fan outlet guide vanes and/or struts) 124. The motor casing 120 circumferentially surrounds at least a portion of the fan 112, the electric motor 102, and/or the core turbine engine. The fan casing or nacelle 122 circumferentially surrounds at least a portion of the motor casing 120, the fan section 104, the electric motor 102, and/or the core turbine engine. The nacelle 122 has an outer surface 126 and an inner surface 128. A space between the inner surface 128 of the nacelle 122 and the motor casing 120 defines a bypass airflow passage 130. The support members 124 span the bypass airflow passage 130, from the motor casing 120 to the inner surface 128 of the nacelle 122. The support members 124 may circumferentially support the fan casing or nacelle 122 about the motor casing 120, and may optionally include an aerodynamic configuration (e.g., in the case of a fan outlet guide vane). In one embodiment, the support members may include both fan outlet guide vanes 125 and struts 127. In another embodiment, the support members may include fan outlet guide vanes 125 that provide sufficient support such that the struts 127 may be omitted. When the struts 127 are included, the struts 127 may or may not include an aerodynamic configuration. An electric propulsion system 100 may include any number of support members 124, such as from 10 to 50 support members, or from 20 to 40 support members. In one embodiment, an electric propulsion system 100 may include between 20 to 40 fan outlet guide vanes 125 and between 2 to 6 struts 127.

During operation of the electric propulsion system 100, a volume of air 132 enters an inlet 134, while an adjacent volume of air 136 passes along the outer surface 126 of the nacelle 122. As the volume of air 132 passes across the fan blades 114, a first portion of air 132 as indicated by arrows 138 is directed or routed into the bypass airflow passage 130, and a second portion of air 132 as indicated by arrow 140 is directed or routed into a core air flowpath of the core turbine engine (not shown). The ratio between the first portion of air 138 and the second portion of air 140 is commonly known as a bypass ratio.

The second portion of air 140 is routed through various stages of the core turbine engine, rotating turbine rotor blades which support rotation of the drive shaft 110. The second portion of air 140 is subsequently routed through a jet exhaust nozzle section 142 of core turbine engine to provide propulsive thrust. Simultaneously, the pressure of the first portion of air 138 is substantially increased as the first portion of air 132 is routed through the bypass airflow passage 130 before being exhausted from a fan nozzle exhaust section 144, also providing propulsive thrust.

While the electric propulsion system 100 described above provides one exemplary embodiment, it should be appreciated that the exemplary embodiment is described by way of example only, and that in other exemplary embodiments, the electric propulsion system 100 may have other suitable configurations. It should also be appreciated, that in still other exemplary embodiments, aspects of the present disclosure may be incorporated into other suitable electric propulsion systems for an aircraft. For example, in other exemplary embodiments, aspects of the present disclosure may be incorporated into an electric turboprop engine or other electric propulsion system for an aircraft. Additionally, aspects of the present disclosure may be incorporated into manned or unmanned aircraft.

Exemplary electric motors or electric propulsion systems include an integrated cooling system, which will now be described in further detail with reference to FIGS. 2A-2C, 3A-3C, and 4A and 4B. The integrated cooling system 200, 300 may utilize single-phase cooling (FIGS. 2A-2C) or two-phase cooling (FIGS. 3A-3C).

Figure 2A:
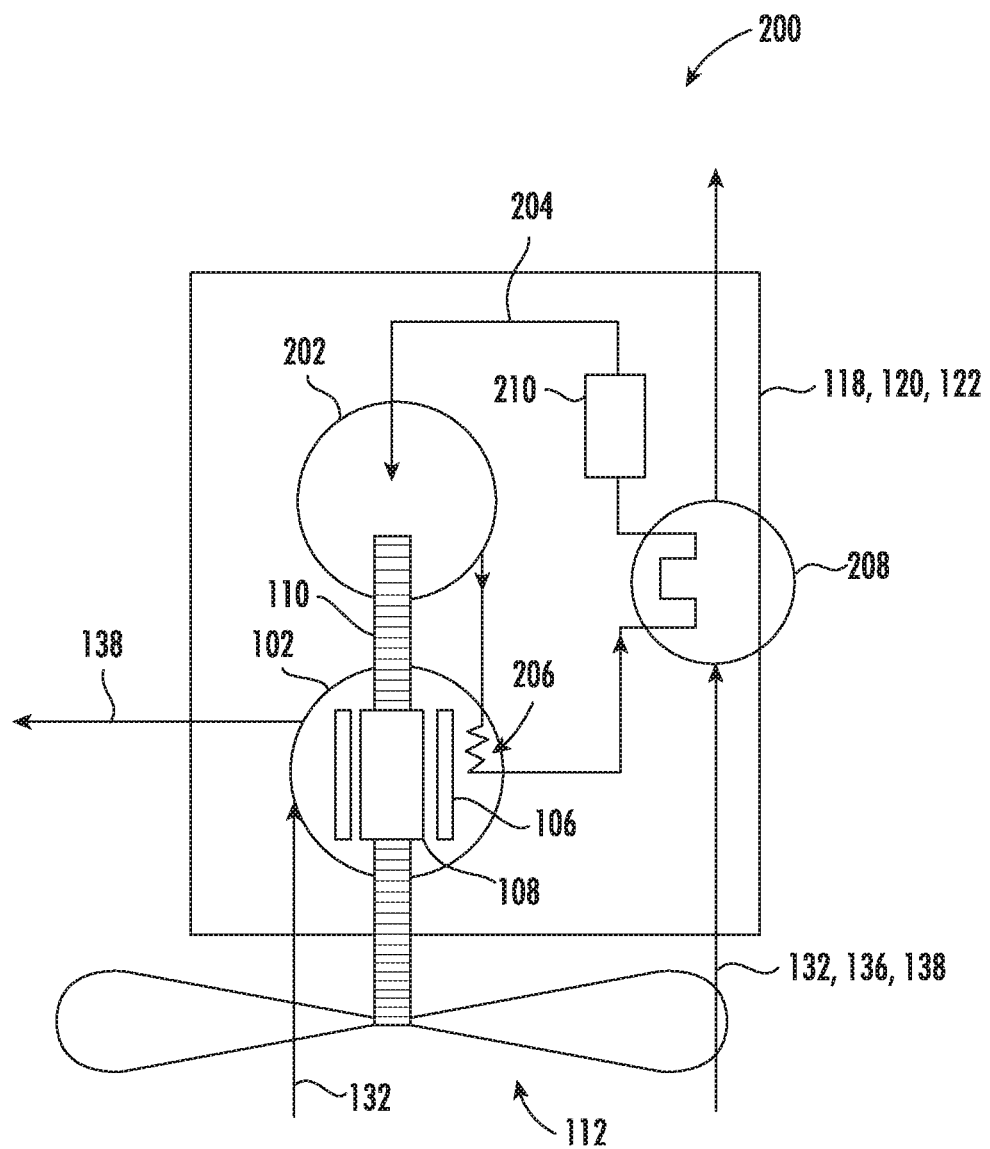
FIGS. 2A-2C schematically show respective alternative embodiments of an electric motor with an integrated cooling system that utilizes single-phase cooling.
Figure 2B:
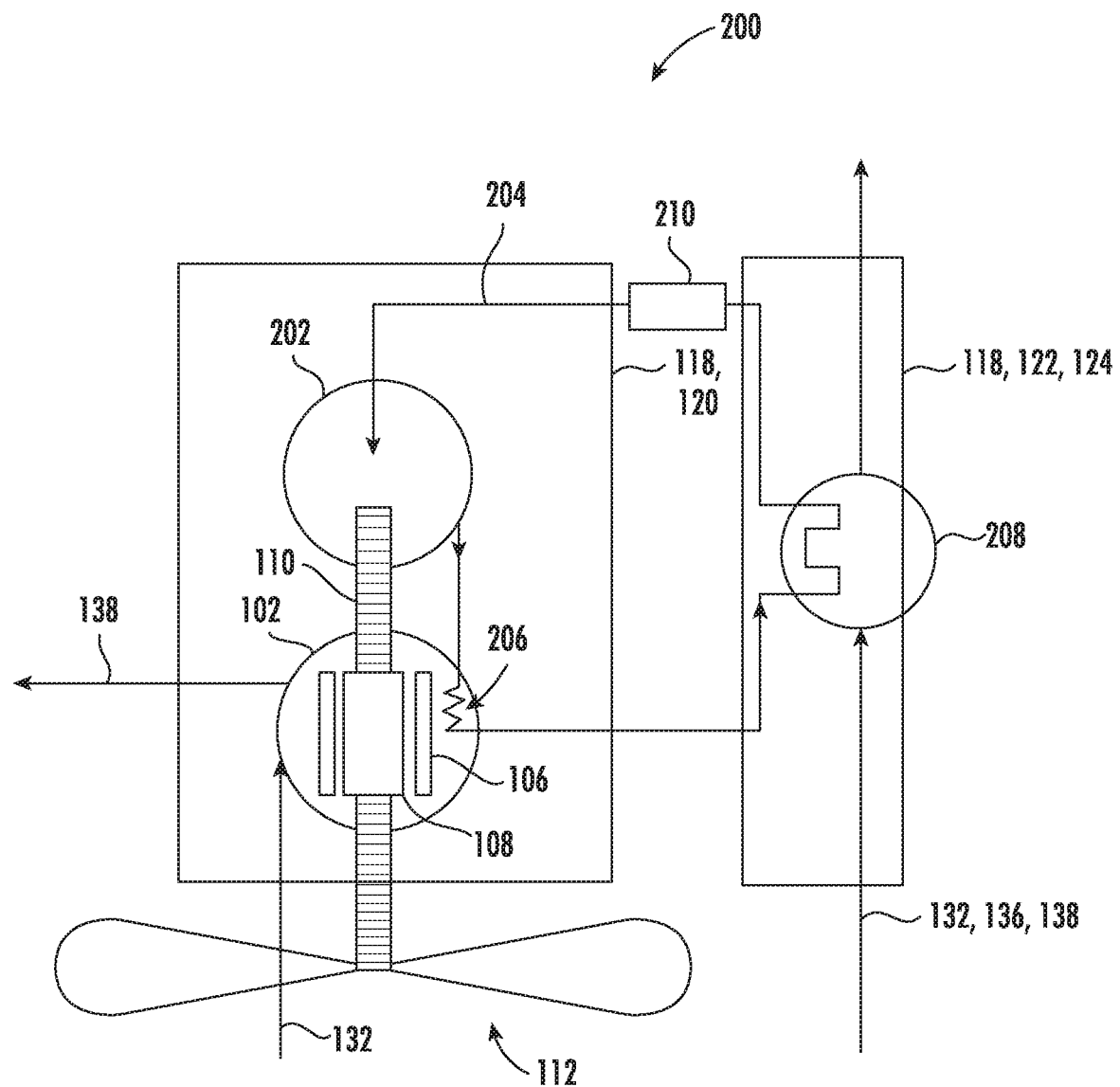
Figure 2C:
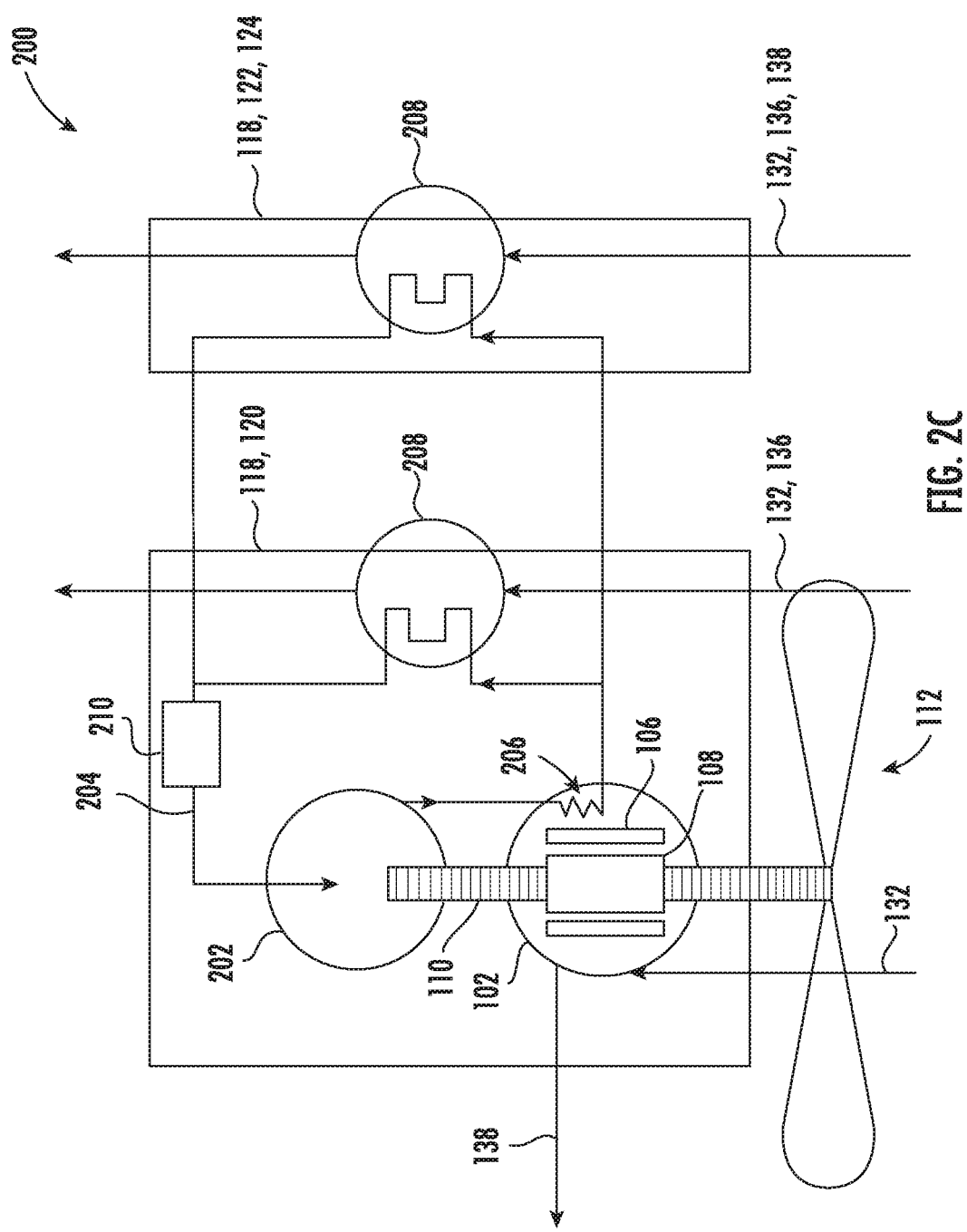
Figure 3A:
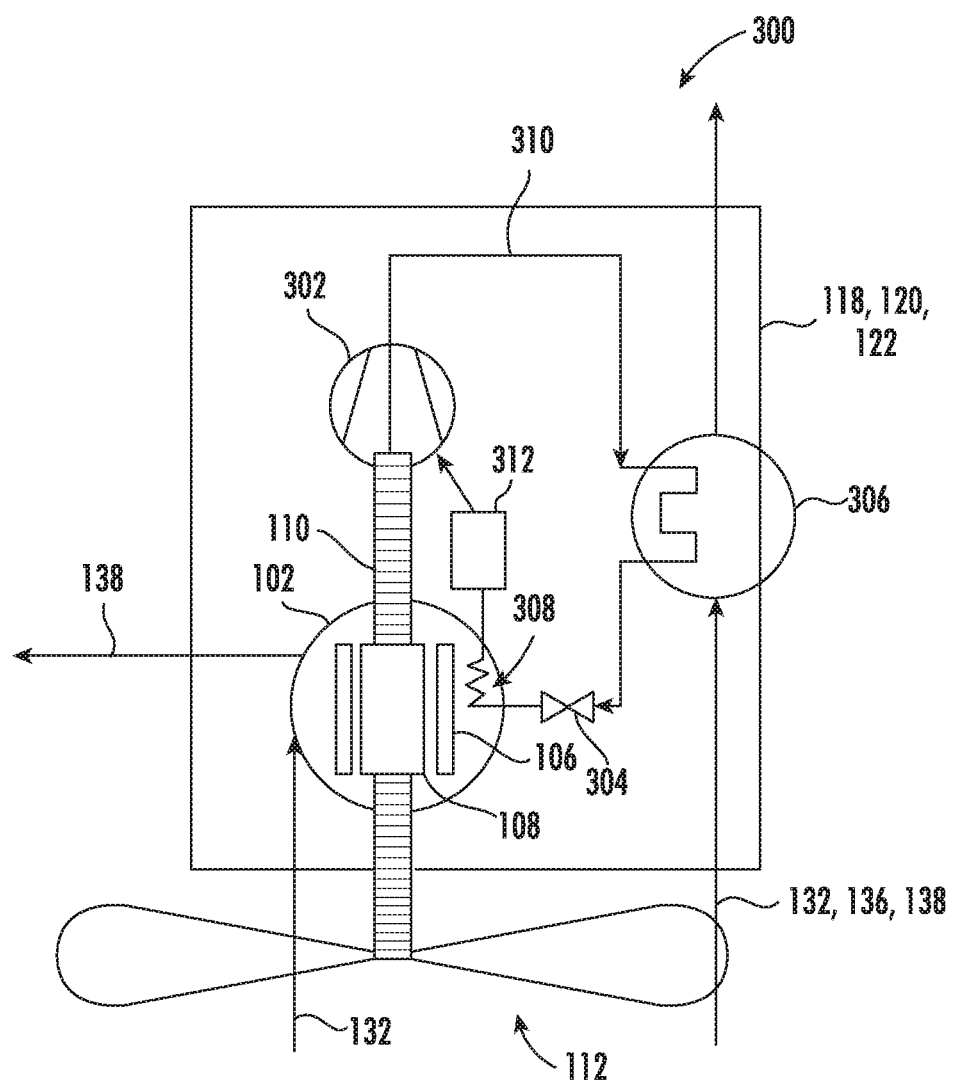
FIGS. 3A-3C schematically show respective alternative embodiments of an electric motor with an integrated cooling system that utilizes two-phase cooling.
Figure 3B:
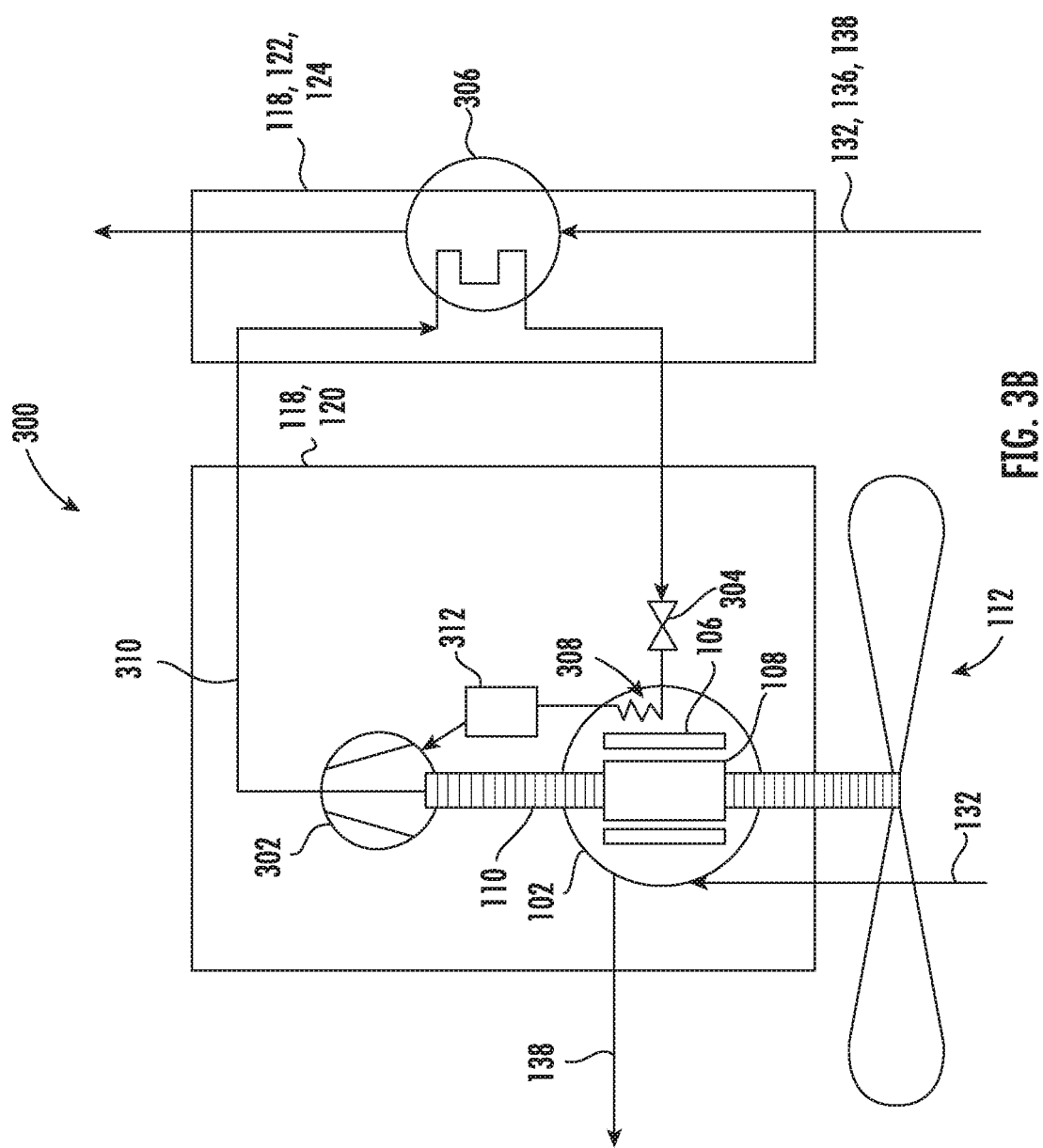
Figure 3C:
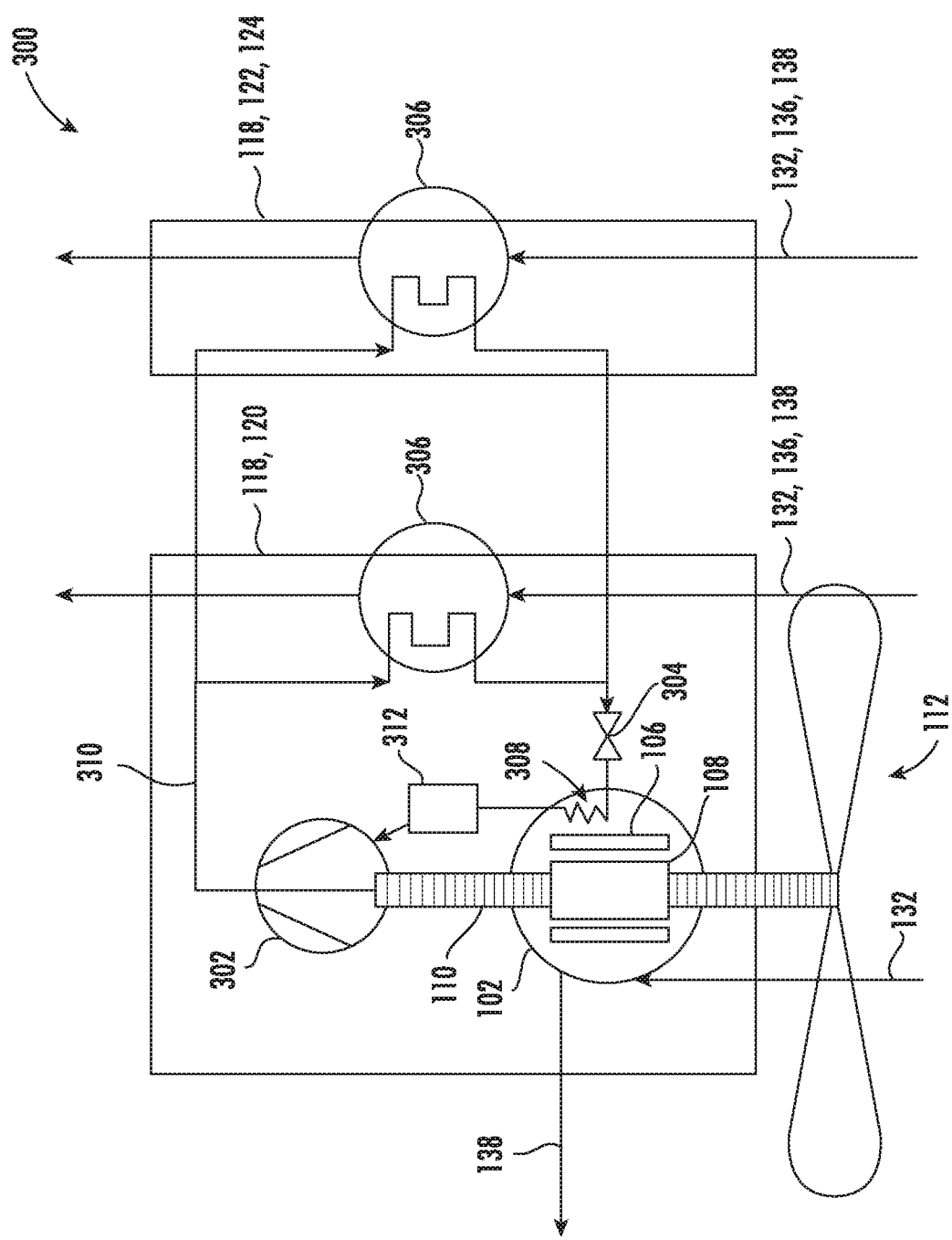

As shown in FIGS. 2A-2C, an electric motor or electric propulsion system with an integrated cooling system 200 includes a pump 202 operably configured to circulate cooling fluid through a fluid pathway 204 that includes a motor cooling conduit 206 configured to cool an electric motor 102, and a casing assembly conduit 208 configured to cool the cooling fluid. The motor cooling conduit 206 defines a pathway for conveying a cooling fluid through or around at least a portion of the electric motor, and has a thermally conductive relationship with the at least a portion of the electric motor 102. The motor cooling conduit 206 may have any desired configuration, including a cooling jacket surrounding at least a portion of the electric motor, and/or one or more internal channels, tubes, pathways, inter-connected or interlaced unit cells, or the like within or surrounding the rotor and/or stator of the electric motor.

The casing assembly conduit 208 is integrally formed within at least a portion of the casing assembly 118. For example, the casing assembly conduit 208 may include a plurality of internal channels, tubes, pathways, inter-connected or interlaced unit cells, or the like integrally formed within at least a portion of the casing assembly 118. The casing assembly conduit 208 defines a pathway for conveying a cooling fluid through at least a portion of the casing assembly 118, and has a thermally conductive relationship with an external surface of the casing assembly 118, such as an external surface of the motor casing 120, an external surface of the inner surface 128 of the nacelle 122, an external surface of the outer surface 126 of the nacelle 122, and/or an external surface of one or more of the support members (e.g., fan outlet guide vanes) 124. Cooling fluid flowing out of the casing assembly conduit 208 may flow into a fluid reservoir 210, such as an expansion tank or the like.

The pump 202 is operably coupled to the drive shaft 110. The electric motor 102 rotates the driveshaft 110, and the driveshaft operates the pump 202, causing the pump 202 to circulate cooling fluid through the fluid pathway 204. The pump 202 may be operably coupled to the driveshaft 110 either directly or across a gearbox, as desired, to obtain a desired pump speed relative to the rotational speed of the driveshaft.

During operation, the pump 202 circulates cooling fluid through the motor cooling conduit 206, thereby transferring heat from the electric motor 102 to the cooling fluid. The cooling fluid exits the motor cooling conduit 206, having been heated by the thermally conductive relationship with the electric motor 102. The cooling fluid then circulates through the casing assembly conduit 208 integrally formed within the casing assembly 118. Airflow passes over the external surface of the casing assembly 118, and heat transfers from the cooling fluid to the airflow. The cooling fluid exits the casing assembly conduit 208, having been cooled by the thermally conductive relationship with the external surface of the casing assembly 118. The cooling fluid then circulates back to the pump 202, and again through the motor cooling conduit 206.

In some embodiments, a fan or propeller 112 operably coupled to the drive shaft 110 forces airflow 132 over the external surface of the casing assembly 118 and/or over the surface of the electric motor 102. Cooling fluid passing through the casing assembly conduit 208 is cooled by airflow passing over the surface of the casing assembly 118, within which the casing assembly conduit 208 are integrally formed.

The casing assembly may have any desired configuration. As shown in FIG. 2A, the casing assembly 118 may include a motor casing 120. As shown in FIGS. 2B and 2C, the casing assembly 118 may include a fan casing or nacelle 122 and a plurality of circumferentially spaced support members (e.g., fan outlet guide vanes) 124 that circumferentially support the fan casing or nacelle 122 about the motor casing 120. The casing assembly conduit may be integrally formed within the motor casing 120 (FIG. 2A), within the nacelle 122 and/or one or more of the support members 124 (FIG. 2B), and/or within both the motor casing 120, and the nacelle 122 and/or support members 124 (FIG. 2C). Additionally, or in the alternative, in the embodiment shown in FIG. 2A, the motor casing 120 may serve as a nacelle defining an external surface of the electric propulsion assembly. Where the motor casing functions as a nacelle, in some embodiments, the motor casing 120 may circumferentially surround at least a portion of the fan section 104.

Referring now to FIGS. 3A-3C, in another exemplary embodiment, an integrated cooling system 300 provides two-phase cooling. The integrated cooling system 300 shown in the embodiments of FIGS. 3A-3C may operate as a refrigeration cycle or a heat pump. As shown in FIGS. 3A-3C, an electric motor with an integrated cooling system 300 may include a compressor 302 and an expansion valve 304 operably configured to effect a cyclical phase change from vapor that condenses in a casing assembly conduit 306 to liquid that evaporates in a motor cooling conduit 308.

The compressor 302 is operably coupled to the drive shaft 110. The electric motor 102 rotates the driveshaft 110, and the driveshaft 110 operates the compressor 302, causing the compressor 302 to circulate cooling fluid through the fluid pathway 310. The compressor 302 may be operably coupled to the driveshaft 110 either directly or across a gearbox, as desired, to obtain a desired compressor speed relative to the rotational speed of the driveshaft. The expansion valve 304 may be provided in fluid communication with an aspect of the fluid pathway 310 located between the casing assembly conduit 306 and the motor cooling conduit 308. the expansion valve imparts a liquid-to-vapor phase change to at least a portion of the cooling fluid flowing from the casing assembly conduit 306.

The casing assembly conduit 306 defines a pathway for conveying a cooling fluid through at least a portion of the casing assembly 118, and has a thermally conductive relationship with an external surface of the casing assembly 118, such as an external surface of the motor casing 120, an external surface of the inner surface 128 of the nacelle 122, an external surface of the outer surface 126 of the nacelle 122, and/or an external surface of one or more of the support members (e.g., fan outlet guide vanes) 124. The motor cooling conduit 308 defines a pathway for conveying a cooling fluid through or around at least a portion of the electric motor, and has a thermally conductive relationship with the at least a portion of the electric motor 102.

During operation, cooling fluid circulates through a fluid pathway 310. The cooling fluid enters the compressor 302 as vapor or saturated vapor, having been heated or superheated when passing through the motor cooling conduit 308 by heat transferring from the electric motor 102 to the cooling fluid. An accumulator 312 may be located upstream of the compressor 302, for example, to prevent liquid from entering the compressor 302. The vapor or superheated vapor exits the compressor 302 and flows through the fluid pathway 310, entering the casing assembly conduit 306 integrally formed within at least a portion of the casing assembly 118. Airflow passes over the external surface of the casing assembly 118, within which the casing assembly conduit is integrally formed. The vapor or superheated vapor is cooled and condenses at it passes through the casing assembly conduit 306. The cooling fluid exits the casing assembly conduit 306 as saturated liquid, having been cooled by the thermally conductive relationship with the external surface of the casing assembly 118. The cooling fluid then passes through the expansion valve 304, where the cooling fluid undergoes an abrupt reduction in pressure, causing adiabatic flash evaporation of at least a portion of the cooling fluid. The flash evaporation of the cooling fluid lowers the temperature of the cooling fluid, which then enters the motor cooling conduit 308, cooling the electric motor 102 by the thermally conductive relationship between the motor cooling conduit and at least a portion of the electric motor 102.

In some embodiments, a fan or propeller 112 operably coupled to the drive shaft 110 forces airflow 132 over the external surface of the casing assembly 118 and/or over the surface of the electric motor 102. As shown in FIG. 3A, the casing assembly 118 may include a motor casing 120, and as shown in FIGS. 3B and 3C, the casing assembly 118 may include a fan casing or nacelle 122 and a plurality of circumferentially spaced support members (e.g., fan outlet guide vanes) 124 that circumferentially support the fan casing or nacelle 122 about the motor casing 120. The casing assembly conduit may be integrally formed within the motor casing 120 (FIG. 3A), within the nacelle and/or the support members 124 (FIG. 3B), and/or within both the motor casing 120 and the nacelle and/or support members 124 (FIG. 3C). Additionally, or in the alternative, in the embodiment shown in FIG. 3A, the motor casing 120 may serve as a nacelle defining an external surface of the electric propulsion assembly. Where the motor casing functions as a nacelle, in some embodiments, the motor casing 120 may circumferentially surround at least a portion of the fan section 104.

Figure 4A:
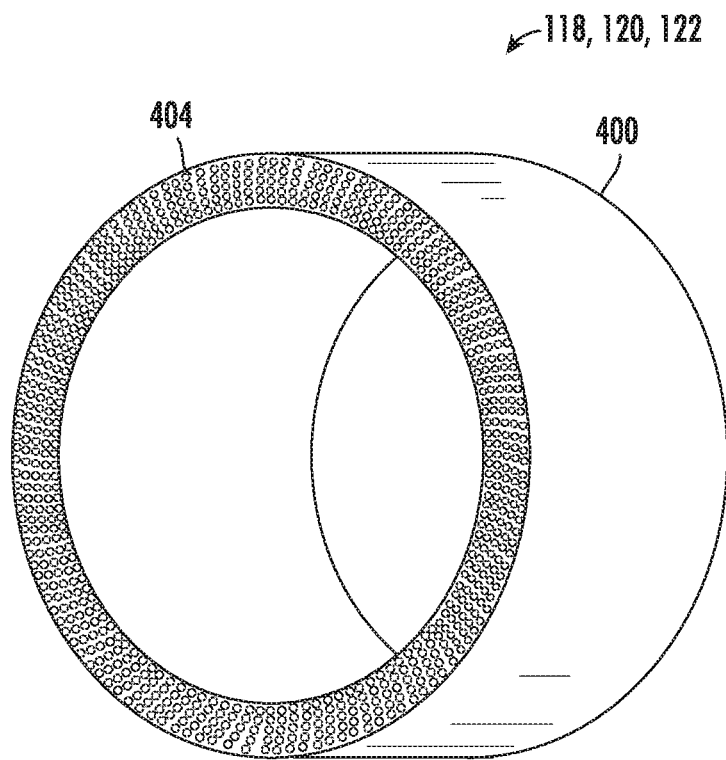
FIGS. 4A and 4B schematically show aspects of a casing assembly with a casing assembly conduit integrally formed therein.
Figure 4B:
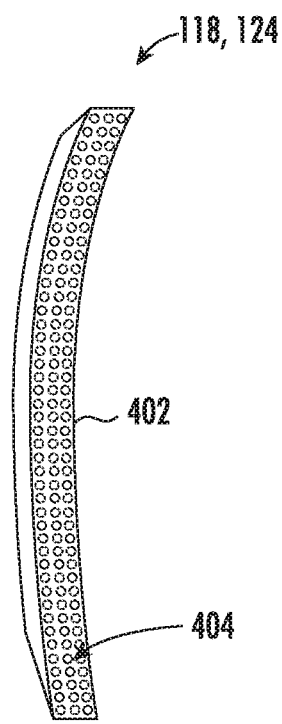

Referring now to FIGS. 4A and 4B, aspects of an exemplary casing assembly will be described in more detail. As discussed herein, a casing assembly may include a motor casing 120 and/or a fan casing or nacelle 122 (FIG. 4A), and a plurality of circumferentially spaced support members 124 such as fan outlet guide vanes 125 and/or struts 127 (FIG. 4B) that circumferentially support the fan casing or nacelle 122 about the motor casing 120. In some embodiments, the casing assembly 118 may include one or more annular casings 400 such as depicted in FIG. 4A and one or more support members 402 as depicted in FIG. 4B. The annular casing 400 depicted in FIG. 4A may be a motor casing 120 and/or a fan casing or nacelle 122. In some embodiments, a plurality of annular casings 400 may be provided, such as a motor casing 120 that circumferentially surrounds at least a portion of the fan 112, the electric motor 102, and/or the core turbine engine, together with a fan casing or nacelle 122 that circumferentially surrounds at least a portion of the motor casing 120, the fan 112, the electric motor 102, and/or the core turbine engine. The support member 402 depicted in FIG. 4B may be a fan outlet guide vane 125 or a strut 127. A plurality of these support members 402 may be provided, for example, together with one or more annular casings 400. For example, one or more support members 402 may be provided to circumferentially support the fan casing or nacelle 122 about the motor casing 120, and/or to circumferentially support the motor casing 120 about the electric motor 102 and/or core turbine engine.

At least a portion of the casing assembly includes a casing assembly conduit 404 integrally formed therein. The casing assembly conduit 404 may include any desired configuration. In some embodiments, the casing assembly conduit 404 may include an array of internal channels, tubes, pathways, or the like. The casing assembly conduit 404 may have a linear configuration and/or a more complex configuration, such as a serpentine, racetrack, or fishbone configuration. In some embodiments, the casing assembly conduit 404 may include an array of inter-connected or interlaced unit cells. In some embodiments, such unit cells may provide structural support in addition to providing a casing assembly conduit 404.

Various aspects of the casing assembly 118 or the casing assembly conduit 208 and/or various aspects of the motor cooling conduit 206 may be manufactured using any desired technology, including machining, drilling, casting, additive manufacturing, a combination thereof, or any other technique. An additive manufacturing process may include any process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Binder Jetting (BJ), Material Jetting (MJ), Photopolymer Jetting (PJ), Sterolithography (SLA), Electron Beam Melting (EBM), Fused Deposition Modeling (FDM), Laser Engineered Net Shaping (LENS), Direct Metal Deposition (DMD), and Hybrid Processes (HP).

Any desired materials may be used to manufacture the components described herein. Exemplary materials include aluminum alloys, steel alloys, titanium alloys, nickel alloys (e.g., superalloys), and composites such as ceramic matrix composite (CMC) materials. Exemplary CMC materials may include silicon carbide, silicon, silica, or alumina matrix materials and combinations thereof. Ceramic fibers may be embedded within the matrix, such as oxidation stable reinforcing fibers including monofilaments like sapphire and silicon carbide, yarn including silicon carbide, alumina silicates, and chopped whiskers and fibers, and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

Figure 5:
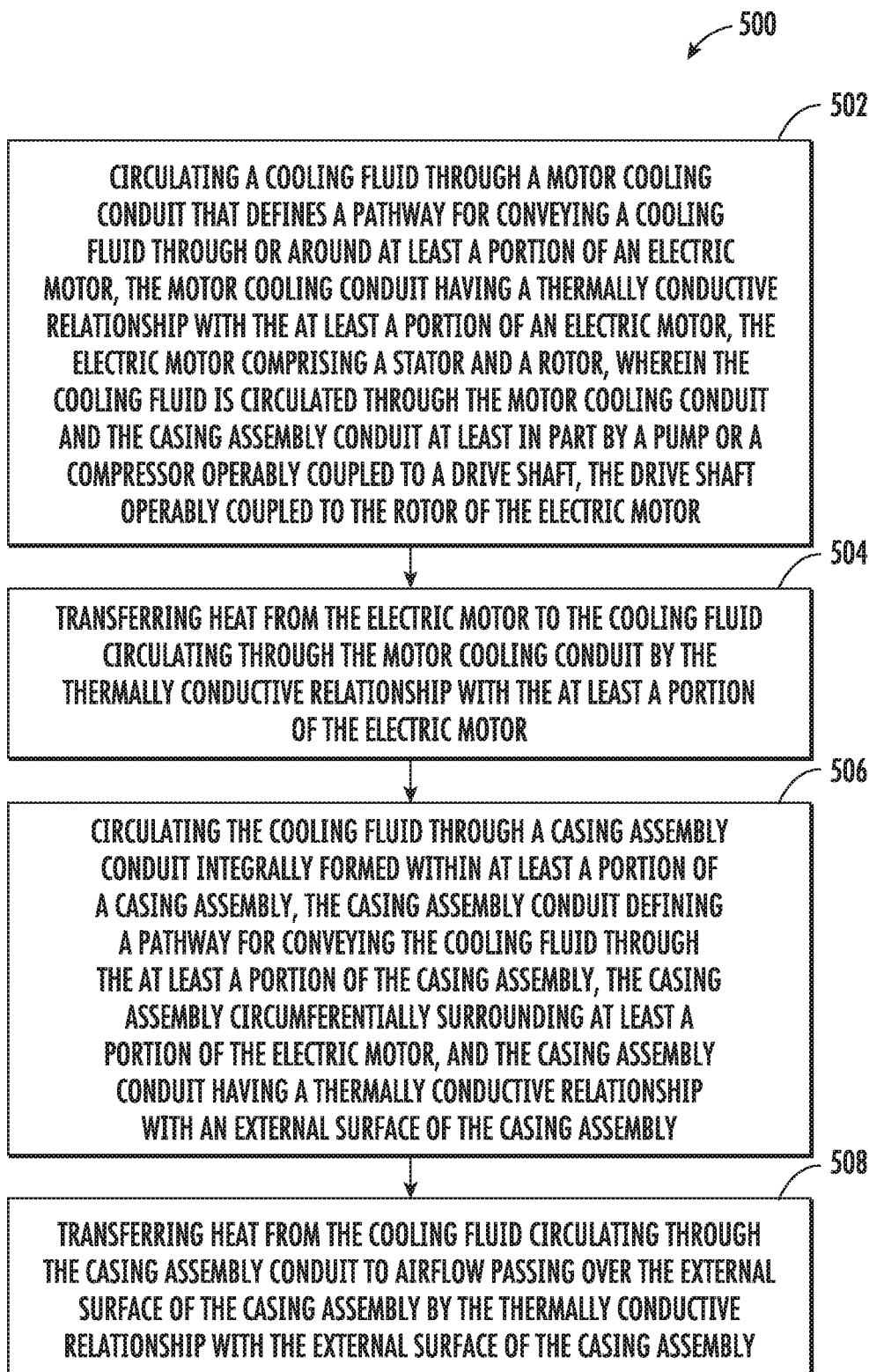
FIG. 5 shows a flowchart of a method of cooling an electric motor used for propulsion of an aircraft.

The present disclosure additionally embraces methods of cooling an electric motor, which, for example, may include an electric motor employed in an electric propulsion system for an aircraft. FIG. 5 shows an exemplary method 500 of cooling an electric motor used for propulsion of an aircraft. The exemplary method 500 includes circulating a cooling fluid through a motor cooling conduit 502. The motor cooling conduit defines a pathway for conveying a cooling fluid through or around at least a portion of the electric motor, and has a thermally conductive relationship with at least a portion of an electric motor, such as a stator and/or a rotor of the electric motor. As such, the method 500 provides for transferring heat from the electric motor to the cooling fluid circulating through the motor cooling conduit 504. Next, the method 500 proceeds with circulating the cooling fluid through a casing assembly conduit integrally formed within at least a portion of a casing assembly that circumferentially surrounds at least a portion of the electric motor 506. The casing assembly conduit defines a pathway for conveying the cooling fluid through the at least a portion of the casing assembly, and has a thermally conductive relationship with an external surface of the casing assembly. As such, the method 500 provides for transferring heat from the cooling fluid circulating through the casing assembly conduit to airflow passing over the external surface of the casing assembly 508.

In the exemplary method 500, the cooling fluid is circulated through the motor cooling conduit 206 and the casing assembly conduit 208 at least in part by a pump or a compressor that is operably coupled to the drive shaft 110 of the electric motor 102. In some embodiments, the method 500 further includes accelerating a stream of airflow passing over the external surface of the casing assembly at least in part by a fan or a propeller 112, which may be operably coupled to the driveshaft 110.

Additionally, in the exemplary method, the casing assembly may include a motor casing 120, a fan casing or nacelle 122; and/or a plurality of support members (e.g., fan outlet guide vanes) 124. The support members 124 may circumferentially support the fan casing or nacelle 122 about the motor casing 120, and/or the motor casing 120 about the electric motor 102 and/or core turbine engine. In various embodiments of the exemplary method 500, at least a portion of the casing assembly conduit 208 is integrally formed within at least a portion of the casing assembly 118 (e.g., at least a portion of the motor casing 120, at least a portion of the nacelle 122, and/or at least a portion of one or more of the plurality of support members 124).

While in general the presently disclosed integrated cooling systems are described as closed systems (i.e. a pressurized system), such closed systems are described by way of example and should not be interpreted as limiting the present disclosure. It will be apparent to those skilled in the art that such a closed system may include cooling fluid refill lines, cooling fluid reservoirs, cooling fluid bypass valves, cooling fluid bypass lines, among other things, any of which may be included alone or in combination without departing from the spirit and scope of the present disclosure. Additionally, the presently disclosed integrated cooling systems need not be implemented in a closed system at all, but rather, in another exemplary embodiment the presently disclosed integrated cooling systems may be implemented in an open system (i.e., a non-pressurized system).

This written description uses exemplary embodiments to describe the presently disclosed subject matter, including the best mode, and also to enable any person skilled in the art to practice such subject matter, including making and using any devices or systems and performing any incorporated methods. As used herein, the terms "first", "second", and "third" may be used interchangeably to distinguish one component from another and are not intended to signify location or importance of the individual components. It is also understood that terms such as "top", "bottom", "outward", "inward", and the like are words of convenience and are not to be construed as limiting terms. The terms "a" and "an" do not denote a limitation of quantity, but rather denote the presence of at least one of the referenced item.

The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine having an integrated cooling system, the electric machine comprising:
    an electric motor comprising a stator, a rotor, and a drive shaft operably coupled to the rotor;
    a motor cooling conduit that defines a pathway for conveying a cooling fluid through or around at least a portion of the electric motor, the motor cooling conduit having a thermally conductive relationship with the at least a portion of the electric motor;
    a casing assembly comprising a casing assembly conduit integrally formed within at least a portion of the casing assembly, the casing assembly conduit defining a pathway for conveying the cooling fluid through the at least a portion of the casing assembly, the casing assembly circumferentially surrounding at least a portion of the electric motor, and the casing assembly conduit having a thermally conductive relationship with an external surface of the casing assembly; and
    a pump or compressor operably coupled to the drive shaft, the pump or compressor being operably configured to circulate the cooling fluid through the motor cooling conduit and the casing assembly conduit,
    wherein, during operation, airflow passes over the external surface of the casing assembly, thereby transferring heat to the airflow from the cooling fluid circulating through the casing assembly conduit by the thermally conductive relationship with the external surface of the casing assembly.

2. The electric machine of claim 1, wherein the casing assembly comprises a motor casing, with at least a portion of the casing assembly conduit being integrally formed within at least a portion of the motor casing.

3. The electric machine of claim 1, wherein the casing assembly comprises a nacelle, with at least a portion of the casing assembly conduit being integrally formed within at least a portion of the nacelle.

4. The electric machine of claim 1, wherein the casing assembly comprises an annular casing and a plurality of support members circumferentially supporting the annular casing, with at least a portion of the casing assembly conduit being integrally formed within one or more of the plurality of support members.

5. The electric machine of claim 4, wherein the plurality of support members comprise fan outlet guide vanes and/or struts.

6. The electric machine of claim 1, wherein the casing assembly comprises a motor casing, a nacelle, and a plurality of fan outlet guide vanes circumferentially supporting the nacelle about the motor casing, with at least a portion of the casing assembly conduit being integrally formed within at least a portion of the motor casing, at least a portion of the nacelle, and/or at least a portion of one or more of the plurality of fan outlet guide vanes.

7. The electric machine of claim 1, wherein during operation, cooling fluid circulates through the motor cooling conduit, thereby transferring heat from the electric motor to the cooling fluid by the thermally conductive relationship with the at least a portion of the electric motor.

8. The electric machine of claim 1, wherein during operation, heat transfers from the electric motor to the cooling fluid by evaporation of at least a portion of the cooling fluid circulating through the motor cooling conduit, at least a portion of the cooling fluid entering the motor cooling conduit as a liquid.

9. The electric machine of claim 1, comprising a fan or a propeller operably coupled to the drive shaft.

10. The electric machine of claim 1, wherein during operation, heat transfers from the cooling fluid to airflow passing over the external surface of the casing assembly by condensation of at least a portion of the cooling fluid circulating through the casing assembly conduit, at least a portion of the cooling fluid entering the casing assembly conduit as a vapor.

11. The electric machine of claim 1, further comprising an expansion valve in fluid communication with an aspect of the fluid pathway located between the casing assembly conduit and the motor cooling conduit, the expansion valve configured to impart a liquid-to-vapor phase change to at least a portion of the cooling fluid flowing from the casing assembly conduit.

12. An electric propulsion system for an aircraft, the system comprising:
an electric motor comprising a stator, a rotor, and a drive shaft operably coupled to the rotor;
a motor cooling conduit that defines a pathway for conveying a cooling fluid through or around at least a portion of the electric motor, the motor cooling conduit having a thermally conductive relationship with the at least a portion of the electric motor;
a fan or propeller operably coupled to the drive shaft;
a casing assembly that circumferentially surrounds at least a portion of the electric motor, the casing assembly comprising:
a motor casing;
a nacelle;
a plurality of support members circumferentially supporting the nacelle about the motor casing; and
a casing assembly conduit integrally formed within at least a portion of the casing assembly, the casing assembly conduit defining a pathway for conveying the cooling fluid through the at least a portion of the casing assembly, and the casing assembly conduit having a thermally conductive relationship with an external surface of the casing assembly; and
a pump or compressor operably coupled to the drive shaft, the pump or compressor being operably configured to circulate cooling fluid through the motor cooling conduit and the casing assembly conduit.

13. The electric propulsion system of claim 12, wherein the plurality of support members comprise fan outlet guide vanes and/or struts.

14. The electric propulsion system of claim 12, comprising least a portion of the casing assembly conduit being integrally formed within at least a portion of the motor casing, at least a portion of the nacelle, and/or at least a portion of one or more of the plurality of support members.

15. The electric propulsion system of claim 12, further comprising a fan or a propeller operably coupled to the drive shaft.

16. A method of cooling an electric machine used for propulsion of an aircraft, the method comprising:
circulating a cooling fluid through a motor cooling conduit that defines a pathway for conveying a cooling fluid through or around at least a portion of an electric motor, the motor cooling conduit having a thermally conductive relationship with the at least a portion of an electric motor, the electric motor comprising a stator and a rotor;
transferring heat from the electric motor to the cooling fluid circulating through the motor cooling conduit by the thermally conductive relationship with the at least a portion of the electric motor;
circulating the cooling fluid through a casing assembly conduit integrally formed within at least a portion of a casing assembly, the casing assembly conduit defining a pathway for conveying the cooling fluid through the at least a portion of the casing assembly, the casing assembly circumferentially surrounding at least a portion of the electric motor, and the casing assembly conduit having a thermally conductive relationship with an external surface of the casing assembly;
transferring heat from the cooling fluid circulating through the casing assembly conduit to airflow passing over the external surface of the casing assembly by the thermally conductive relationship with the external surface of the casing assembly;
wherein the cooling fluid is circulated through the motor cooling conduit and the casing assembly conduit at least in part by a pump or a compressor operably coupled to a drive shaft, the drive shaft operably coupled to the rotor of the electric motor.

17. The method of claim 16, further comprising accelerating the airflow passing over the external surface of the casing assembly at least in part by a fan or a propeller operably coupled to a driveshaft.

18. The method of claim 16, wherein the casing assembly comprises:
a motor casing;
a nacelle; and
a plurality of support members circumferentially supporting the nacelle about the motor casing; and
at least a portion of the casing assembly conduit being integrally formed within at least a portion of the motor casing, at least a portion of the nacelle, and/or at least a portion of one or more of the plurality of support members.

19. The method of claim 16, comprising:
transferring heat from the electric motor to the cooling fluid by evaporation of at least a portion of the cooling fluid circulating through the motor cooling conduit, at least a portion of the cooling fluid entering the motor cooling conduit as a liquid; and/or transferring heat from the cooling fluid to airflow passing over the external surface of the casing assembly by condensation of at least a portion of the cooling fluid circulating through the casing assembly conduit, at least a portion of the cooling fluid entering the casing assembly conduit as a vapor.

\* \* \* \* \*